United States Patent
Kögler et al.

(10) Patent No.: US 10,427,525 B2
(45) Date of Patent: Oct. 1, 2019

(54) METHOD FOR CONTROLLING A MOTOR VEHICLE COMFORT SYSTEM

(71) Applicant: VOLKSWAGEN AKTIENGESELLSCHAFT, Wolfsburg (DE)

(72) Inventors: Indra-Lena Kögler, Berlin (DE); Mathias Kuhn, Berlin (DE); Filip Piotr Chudzinski, Hamburg (DE); Sönke Petersen, Berlin (DE); Omer Yosha, Berlin (DE); Alexander Hahn, Braunschweig (DE)

(73) Assignee: Volkswagen AG (DE)

( * ) Notice: Subject to any disclaimer, the term of this patent is extended or adjusted under 35 U.S.C. 154(b) by 60 days.

(21) Appl. No.: 15/305,948

(22) PCT Filed: May 5, 2015

(86) PCT No.: PCT/EP2015/059788
§ 371 (c)(1),
(2) Date: Oct. 21, 2016

(87) PCT Pub. No.: WO2015/188981
PCT Pub. Date: Dec. 17, 2015

(65) Prior Publication Data
US 2017/0087989 A1    Mar. 30, 2017

(30) Foreign Application Priority Data
Jun. 13, 2014 (DE) .................. 10 2014 211 340

(51) Int. Cl.
*B60K 37/06* (2006.01)
*G06F 3/0484* (2013.01)
*G06F 3/0488* (2013.01)
*G06F 3/0481* (2013.01)

(52) U.S. Cl.
CPC ............ *B60K 37/06* (2013.01); *G06F 3/0488* (2013.01); *G06F 3/04815* (2013.01);
(Continued)

(58) Field of Classification Search
None
See application file for complete search history.

(56) References Cited

U.S. PATENT DOCUMENTS

2007/0136681 A1* 6/2007 Miller ................. G06F 3/04817
                                                      715/782
2011/0307834 A1* 12/2011 Wu ........................ G06F 3/0481
                                                      715/836
(Continued)

FOREIGN PATENT DOCUMENTS

CN    103324393 A    9/2013
DE    102007039442 A1    2/2009
(Continued)

OTHER PUBLICATIONS

Search Report and Written Opinion for International Patent Application No. PCT/EP2015/059788; dated Sep. 22, 2015. Office Action for Chinese Patent Application No. 201580020510.8; dated Mar. 20, 2019.

* cited by examiner

*Primary Examiner* — Christopher J Fibbi
(74) *Attorney, Agent, or Firm* — Barnes & Thornburg LLP

(57) ABSTRACT

A method for controlling a motor vehicle comfort system, wherein the control is carried out with the aid of a touch-sensitive display and user interface assigned to the comfort system. In at least one operating mode, the virtual representation of at least one body having a three-dimensional appearance is generated in a first position on the touch-sensitive display and user interface and at least one function that can be executed by the comfort system is represented on the surface of the body, wherein the body is moved after (Continued)

rotating around a horizontal or vertical axis into another position in which at least one other function which can be executed by the comfort system is represented on the visible surface of the body.

10 Claims, 10 Drawing Sheets

(52) U.S. Cl.
CPC ..... *G06F 3/04847* (2013.01); *B60K 2370/111* (2019.05); *B60K 2370/113* (2019.05); *B60K 2370/115* (2019.05); *B60K 2370/133* (2019.05); *B60K 2370/1438* (2019.05); *B60K 2370/1468* (2019.05); *B60K 2370/152* (2019.05); *B60K 2370/164* (2019.05); *B60K 2370/52* (2019.05)

(56) References Cited

U.S. PATENT DOCUMENTS

| | | | | |
|---|---|---|---|---|
| 2012/0260218 A1* | 10/2012 | Bawel | ................. | G06F 3/04815 715/841 |
| 2013/0314321 A1* | 11/2013 | Deom | .................... | B60K 37/06 345/160 |
| 2014/0282073 A1* | 9/2014 | Curran | ................. | G06F 3/0488 715/750 |
| 2015/0007082 A1* | 1/2015 | Fischer | .............. | G06F 3/04815 715/771 |
| 2015/0020020 A1* | 1/2015 | White | .................. | G06F 3/0482 715/783 |

FOREIGN PATENT DOCUMENTS

| | | |
|---|---|---|
| GB | 2434068 A | 7/2007 |
| WO | 2013104378 A1 | 7/2013 |

METHOD FOR CONTROLLING A MOTOR VEHICLE COMFORT SYSTEM

PRIORITY CLAIM

This patent application is a U.S. National Phase of International Patent Application No. PCT/EP2015/059788, filed 5 May 2015, which claims priority to German Patent Application No. 10 2014 211 340.7, filed 13 Jun. 2014, the disclosures of which are incorporated herein by reference in their entirety.

SUMMARY

Illustrative embodiments relate to a method for controlling a motor-vehicle comfort system.

BRIEF DESCRIPTION OF THE DRAWINGS

Disclosed embodiments are represented in the drawings and will be elucidated in greater detail in the following description. In these drawings, like reference symbols relate to like, comparable or functionally identical components, in which connection corresponding or comparable properties and benefits are achieved, even if a repeated description has been omitted.

Shown, schematically in each instance, are.

DETAILED DESCRIPTION

Figure 1:
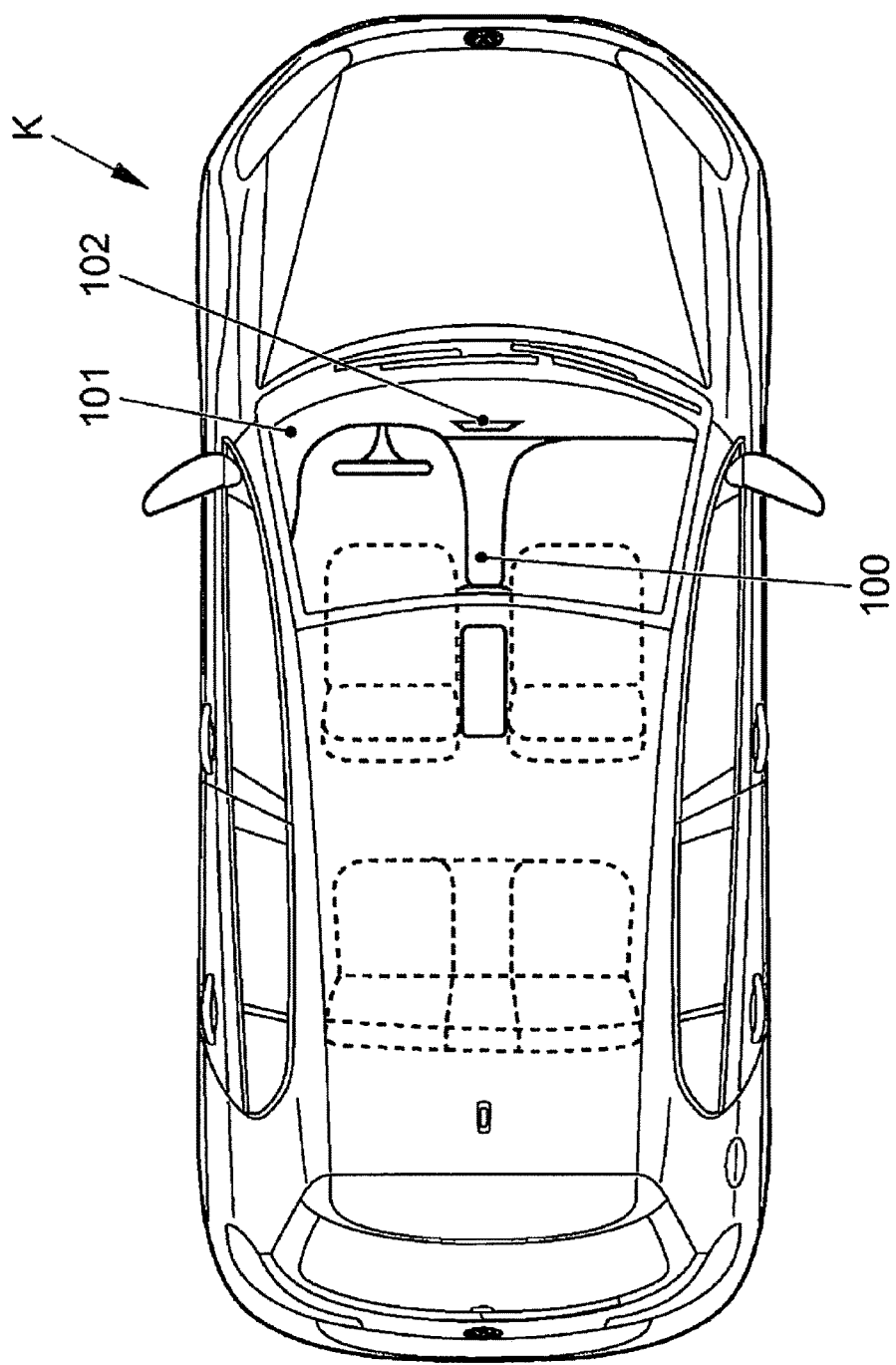
FIG. 1 schematically shows a disclosed motor vehicle with a comfort system that can be controlled by the disclosed method.

Diverse methods for controlling motor-vehicle comfort systems are known from the general state of the art. Among other things, it is known to control comfort systems by touching a touch-sensitive display-and-operating area assigned to the comfort system, for example, as a touchscreen. For example, as a result of touching particular regions, functions assigned to these regions can be implemented. Such a function may be, for example, the playing or the selection of a particular radio station.

A plurality of functions capable of being selected by touch may have been arranged on a touch-sensitive display-and-operating area. Sometimes it is also necessary that an operator has to wade laboriously through operating levels of an operating menu until he/she arrives at the desired function. In some cases this requires unduly high attentiveness on the part of the operator.

From a downloadable software application on the market from a smartphone manufacturer (see http://www.weather-cube.com) it is known to present weather data on a virtual body taking the form of a cube. The cube is rotatable about a horizontal and a vertical axis. Furthermore, the cube is subdivided into many individual regions, some of which are also individually rotatable.

The disclosed embodiments provide a method that enables a simple and intuitive operation of a motor-vehicle comfort system.

The disclosed embodiments provide a method for controlling a motor-vehicle comfort system, wherein control takes place with the aid of a touch-sensitive display-and-operating area assigned to the comfort system.

In accordance with the disclosed embodiments, at least one operating mode the virtual representation of at least one body giving a three-dimensional impression is generated in a first position on the touch-sensitive display-and-operating area, and at least one function capable of being implemented by the comfort system is displayed on the visible surface of the body. The body can only be rotated as a whole. After rotation about a horizontal or vertical axis, the body is moved into a different position in which at least one other function capable of being implemented by the comfort system is displayed on the visible surface of the body.

In this way, an extremely simple and intuitive operation of the comfort system is made possible. Desired functions can be attained quickly and straightforwardly.

The design of the body giving a three-dimensional impression may be highly variable. A cube-like design has proved to be beneficial but is by no means imperative. Other designs—for example, a cylindrical or a spherical design—are also conceivable.

The term "comfort system" in this connection is to be understood quite broadly and may include systems to be found in motor vehicles, such as, for example, audio systems, communication systems, air-conditioning systems and navigation systems. The list is only exemplary.

The implementable functions resulting from this are manifold. The following may be mentioned by way of non-definitive examples:

playing a particular music track from a particular music album playing a particular radio station setting a particular temperature setting a particular fan stage (blower speed)

setting a particular air distribution (up, down, right, left)

selecting a particular contact entry from an address book etc.

The presence of a touch-sensitive display-and-operating area does not necessarily have to mean that operation is possible exclusively via a touch of the display-and-operating area. Operation in contactless manner is also conceivable, given sufficiently close spacing from the operating area, for example, through use of capacitive sensors or such like.

According to a first disclosed embodiment, it is conceivable that after representation of the body in a particular position or after the movement of the body into such a position the comfort system is controlled automatically, at the latest after a certain time-delay, in such a manner that the displayed function is also implemented.

As a result, the operation can be simplified further, since a further operating step for the operator can be dispensed with. Nevertheless, it is conceivable that a displayed implementable function is implemented only when a further operating step is performed. This may be, for example, the tapping of the displayed function on the operating area.

Incidentally, it should be mentioned that the display of a function in a variety of ways is also conceivable. This can be done as a symbol or plain text.

For straightforward operation, it has proved to be highly beneficial if a particular store of functions, with a first and with a last displayable function, is associated with the rotation of the body about a particular axis. In this case, after repeated rotation of the body in a particular direction and after an associated display of the last or first function from this store of functions, the first or last function is displayed again upon further rotation of the body in the same direction. In this further development, the body can accordingly be rotated infinitely. A maneuvering through functions is distinctly simplified thereby.

Another further disclosed embodiment proposes that the selection of playable music tracks from a particular music album is made available by way of store of functions with the rotation of the body about a first axis, and the selection of a playable track from different music albums is made available with the rotation of the body about a second axis.

In this connection it has proved expedient to choose the first axis to be vertical and the second axis to be horizontal.

By this means, an operation is made possible that accommodates the natural feeling of an operator.

To cause many functions of a comfort system to be implemented easily, in another disclosed embodiment several bodies giving a three-dimensional impression can be displayed, spaced from one another, in which case functions from one functional area of the comfort system are assigned to one or more bodies.

For instance, functional area "Air conditioning" can be assigned to one or more bodies, functional area "Audio" can be assigned to another body or to other bodies, and so on.

In this context it is conceivable that functions are assigned to a body in a manner depending on the position of at least one other body. In this way, the functional density can be increased, and only comparatively few bodies are needed, even in the case of high functional diversity.

Finally, a motor vehicle with a comfort system and with at least touch-sensitive display-and-operating area assigned to the system for the purpose of operation is also to be protected. In this case, the display-and-operating area can be controlled in such a manner that the virtual representation of at least one body giving a three-dimensional impression takes place on the area, a selection of implementable functions of the comfort system being possible by rotation of the body about a horizontal or vertical axis by means of a swipe gesture.

The comfort system of such a motor vehicle can be operated easily and intuitively, so that a driver of the motor vehicle is distracted as little as possible in the course of the operation of the comfort system.

In FIG. 1 a motor vehicle K is evident, in which a center console 100, an instrument panel 101 and a touch-sensitive display-and-input area, i.e., a touch-screen 102, have been numbered.

Figure 2:
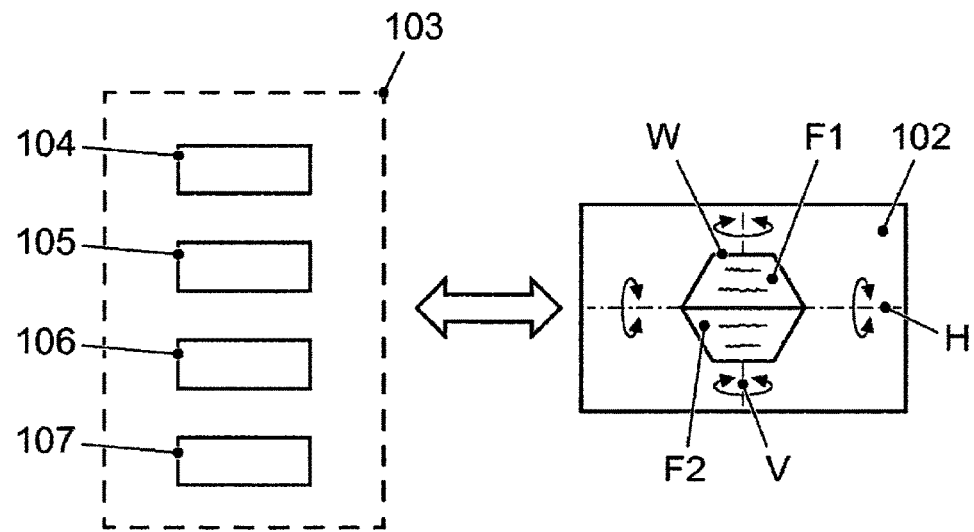
FIG. 2 schematically shows the representation of the comfort system and of the touch-sensitive display-and-operating area assigned to the disclosed system.

From FIG. 2 it is evident that the touch-screen 102 is assigned to a comfort system 103. The comfort system can accordingly be controlled or operated via the touch-screen 102.

The comfort system 103 in the disclosed embodiment comprises four functional areas, namely the functional areas "Audio" 104, "Air conditioning" 105, "Communication" 106 and "Navigation" 107. In this connection, further necessary components—such as, for example, memory units for storing MP3 files, contact data or navigation data—are not represented, not being necessary for understanding the disclosed embodiments.

Other configurations of the comfort system 103, with more or fewer functional areas, are of course conceivable.

For the purpose of controlling the comfort system 103, the virtual representation of at least one body giving a three-dimensional impression as an eight-edged cube W with, correspondingly, six faces F1 to F6 is generated on the touch-screen 102. The cube W can be rotated by horizontal or vertical swipe gestures of an operator about a vertical axis V or a horizontal axis H (as evident in the figure). Of the faces F1 to F6, faces F1 and F2 are evident in the figure, due to rotation.

When the touch-screen 102 is switched on, the cube W is firstly displayed as standard in such a way that only one face, for example, face F1, is visible.

On each of the faces F1 to F6 at least one function capable of being implemented by the comfort system 103 is displayed (only indicated by line). By rotation of the cube W about one of the axes V or H, starting from face F1 another face can now be made visible on the touch-screen 102. A different face, however, is associated with a different implementable function. Consequently, navigation and switching between implementable functions can be undertaken extremely easily and intuitively.

Figure 3:
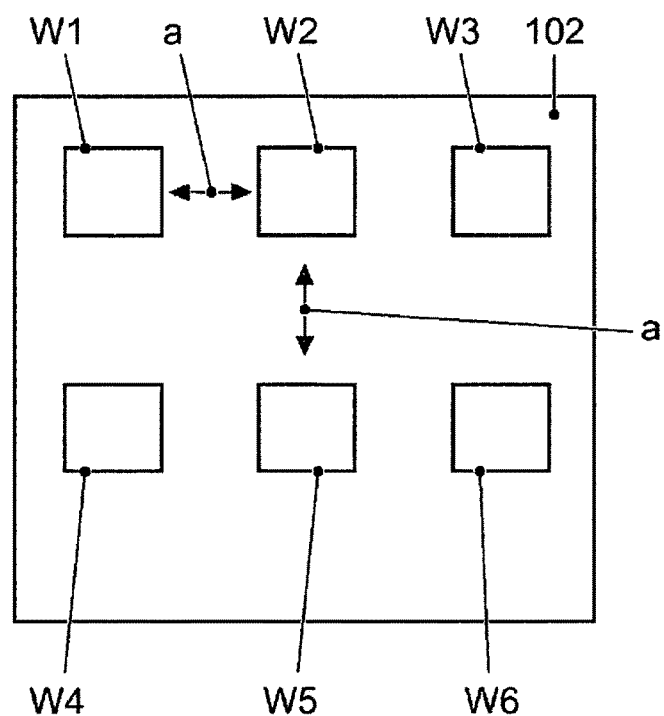
FIG. 3 schematically shows the sole representation of the touch-sensitive display-and-operating area with several bodies giving a three-dimensional impression.

By reason of the possible functional scope of the comfort system 103, however, several cubes—for example, six cubes W1 to W6—may be displayed on the touch-screen 102, the mode of operation of each of which resembles that of cube W. In the case of the representation of several cubes, these are spaced (a) from one another, as can be gathered from FIG. 3. In some cases, various of the functional areas 104 to 107 are assigned to cubes W1 to W6.

In the following it will be explained in detail how, with the aid of the cubes W1 to W6—especially, cubes W1, W2 and W4—a control of the comfort system 103 is effected.

Figure 4A:
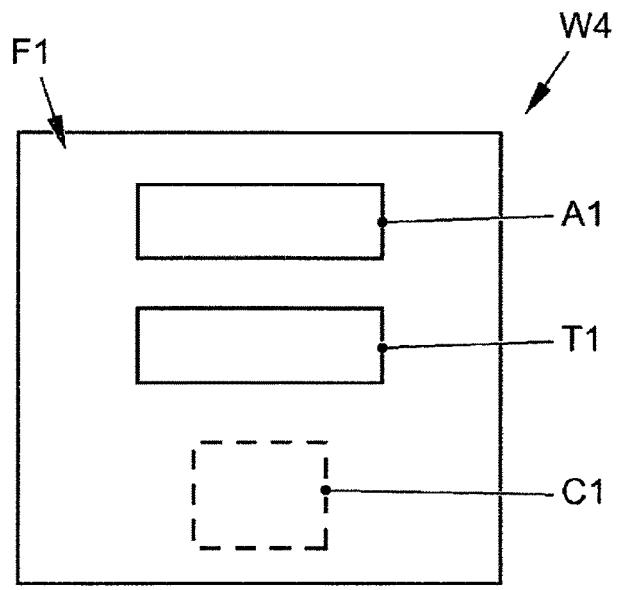
FIG. 4 schematically shows the representation of one of the bodies according to FIG. 3, which is assigned to functional area "Audio" of the comfort system, in the course of rotation about a horizontal axis.

Accordingly, with reference to FIGS. 4 and 5 it will be described how, by means of cube W4, functions pertaining to functional area 104 "Audio" can be implemented:

In the initial position of cube W4 the name of a first stored music album A1 is displayed on face F1, below that the first track T1 thereof and also an image of the associated cover C1 (cf. FIG. 4a).

Accordingly, the implementable function "Play the first track T1 from music album A1" is linked with this display. In the disclosed embodiment, for the sake of simplicity, after initial display of such an implementable function the function is also implemented automatically after a certain time-delay of a few seconds. A further operating step is accordingly not absolutely necessary for an operator. Departing from the disclosed embodiment, however, it is conceivable that yet another operating step is required for the purpose of implementing a displayed function. This may be, for example, the tapping of the visible face of the cube.

If, however, the playing of tracks of another album is desired, an operator B can rotate cube W4 about its horizontal axis H by means of a vertical swipe gesture and can thereby select another album. After a single swipe gesture, cube W4 rotates until another face is visible, and then remains in this position until a new swipe gesture is undertaken. This applies to all the cubes W1 to W6.

Figure 4B:
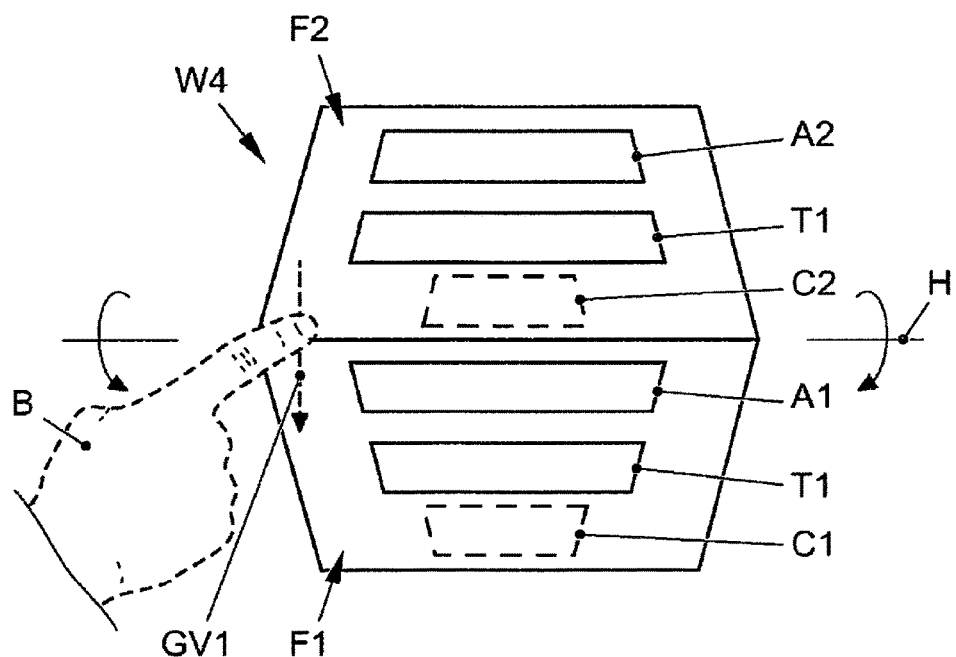
Figure 4C:
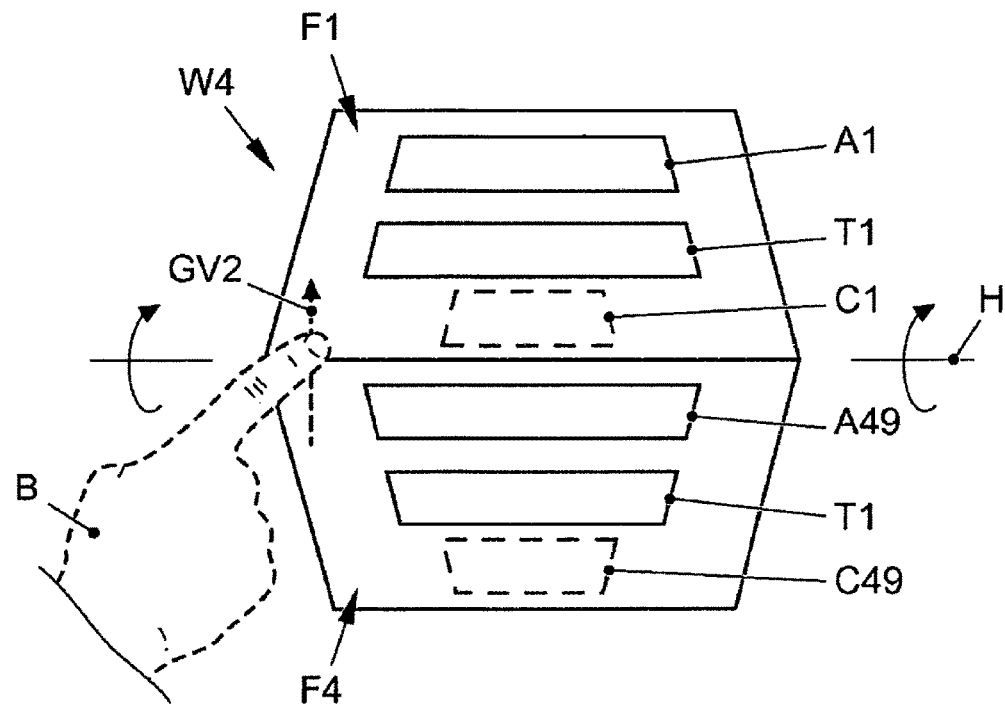

In concrete terms, by a vertical, downward-directed swipe gesture GV1 an operator B arrives at the representation of another face (F2) of cube W4, on which the second available album A2, the associated cover C2 of which and also the first playable track T1 of which are now displayed (cf. FIG. 4b, wherein only a transient position is displayed). By a further rotation of cube W4 in the same direction, the operator B comes to a third album, and so on. By continuing the rotation in the same direction, he/she can consequently come to a final album. If the operator B then rotates cube W4 one turn further in the same direction, he/she gets back to the first album A1. For this purpose he/she can also go back again in the opposite direction by a repeated rotation.

Starting from the representation according to FIG. 4a, an operator B can, by a vertical, upward-directed swipe gesture GV2, also arrive immediately at the representation of another face (F4), on which the last available album (in the present case, the 49th album A49), the associated cover C49 of which and the first playable track T1 of which are then displayed (cf. FIG. 4c, wherein once again only a transient position is displayed). By an 'infinite' rotation of cube W4 about the horizontal axis H, a convenient navigation through available music albums in both directions of rotation is accordingly possible.

If, however, starting from the display of the first track T1 of an album (cf. FIGS. 4a and 5a), an operator B would like to select another track of a particular album rapidly, he/she can easily navigate between the tracks of an album by horizontal swipe gestures.

Figure 5A:
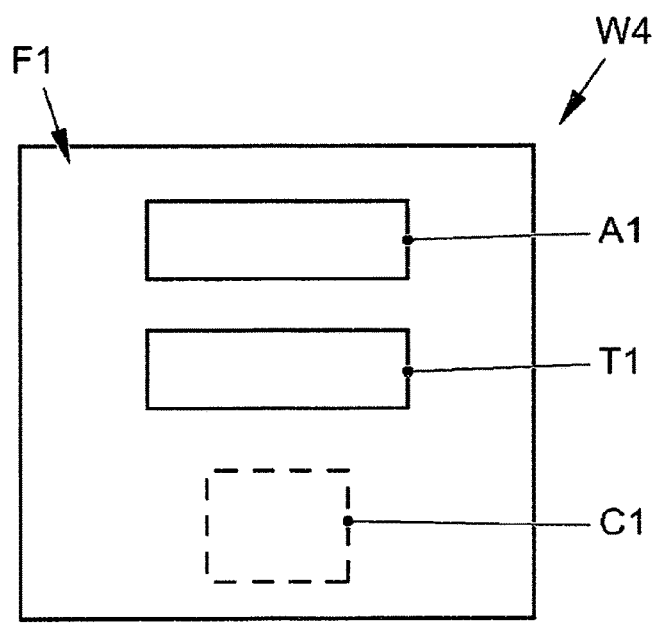
FIG. 5 schematically shows the representation of the body according to FIG. 4 in the course of rotation about a vertical axis.
Figure 5B:
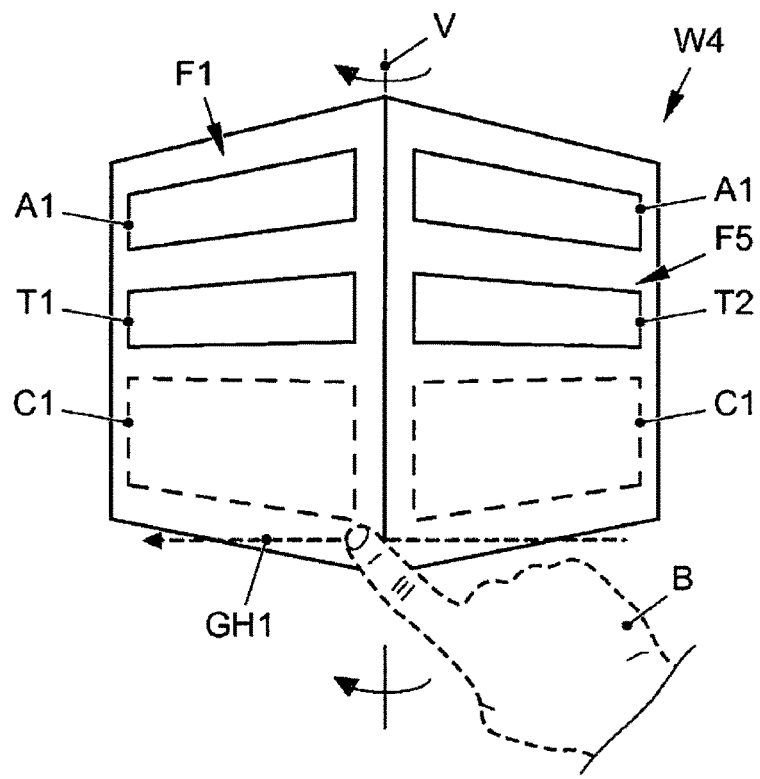

By a horizontal swipe gesture to the left (GH1), the operator rotates cube W4 about a vertical axis V to face F5, on which the second track T2 of album A1 is now displayed (cf. FIG. 5b).

Figure 5C:
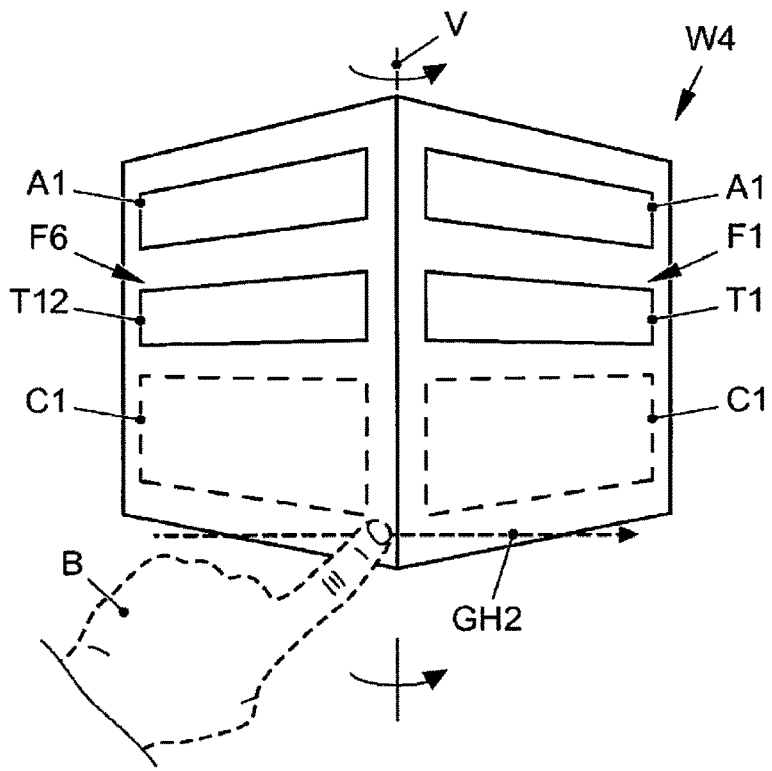

A horizontal swipe gesture to the right (GH2) rotates cube W4 to face F6, on which the last track (here, the twelfth track T12) of album A1 is now immediately displayed (cf. FIG. 5c).

It should be pointed out that also in the course of the rotation of cube W4 about the vertical axis V the operation-and-execution logic ("infinite rotation", automatic implementation of a displayed function after a defined or definable time-delay) is designed in a manner analogous to that in the course of the rotation about the horizontal axis H.

If, starting from the representation according to FIG. 4a or 5a, no further operation by the operator B takes place, track T1 from the first album A1 is firstly played. After this, the playing of the music tracks continues as far as the last music track of the last album A49. Subsequently the playing of the first track T1 from the first album A1 takes place again. It goes without saying that in this case the displays of the tracks, of the albums and also of the covers on the visible face of cube W4 are also adapted dynamically.

Figure 6A:
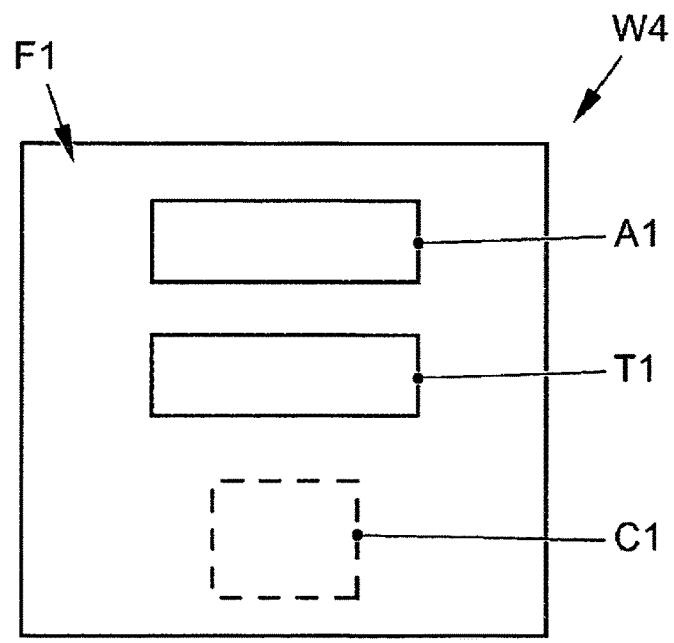
FIG. 6 schematically shows another representation of the body according to FIG. 4 in the course of rotation about a vertical axis.
Figure 6B:
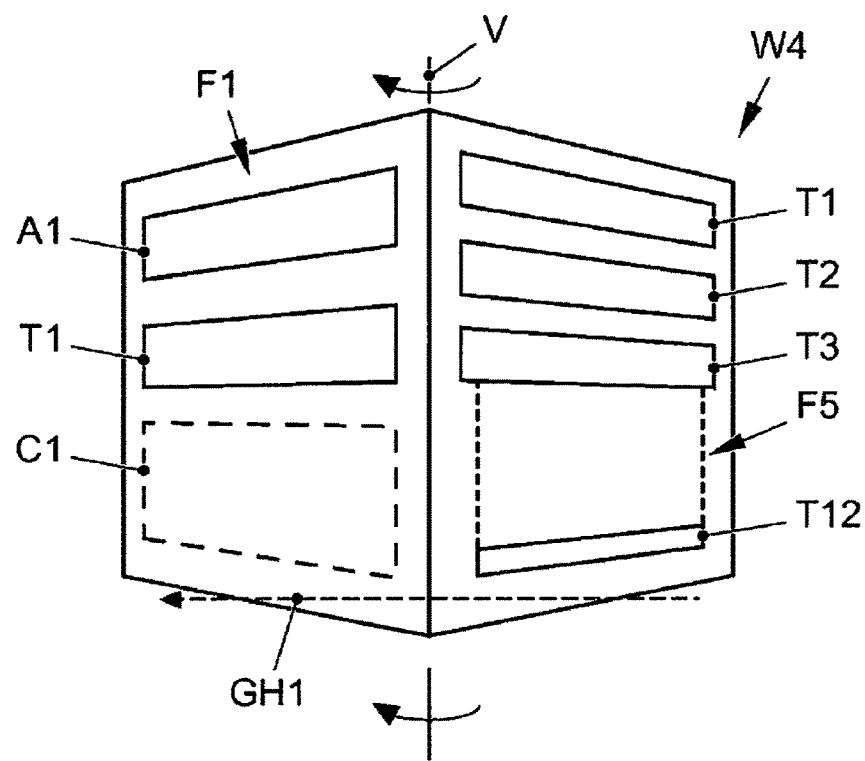

According to the disclosed embodiment represented in FIG. 6, starting from a display of the first track of an album (e.g., T1 from A1, cf. FIG. 6a), by a rotation of cube W4 about a vertical axis V by means of a horizontal swipe gesture GH1 a list display of all the playable tracks of a particular album (e.g., tracks T1 to T12 from album A1) can be generated. It is also conceivable that, starting from a display of the first track of an album, a list display of all the actually playable tracks is generated by a rotation of cube W4 in the opposite direction, the tracks may be listed in ascending alphabetical order (not represented).

In both cases a rapid navigation through the tracks by vertical swipe gestures and a selection of a track by a tapping is then conceivable and practical.

Cube W2 is represented in greater detail in FIG. 7. The cube is linked with functional area 105 "Air conditioning".

Cube W2 is located in a position in which its face F1 is evident. On this face a fan symbol L and, below that, a fan speed L0 to be set as standard by the comfort system 103 are displayed (cf. FIG. 7a).

Figure 7A:
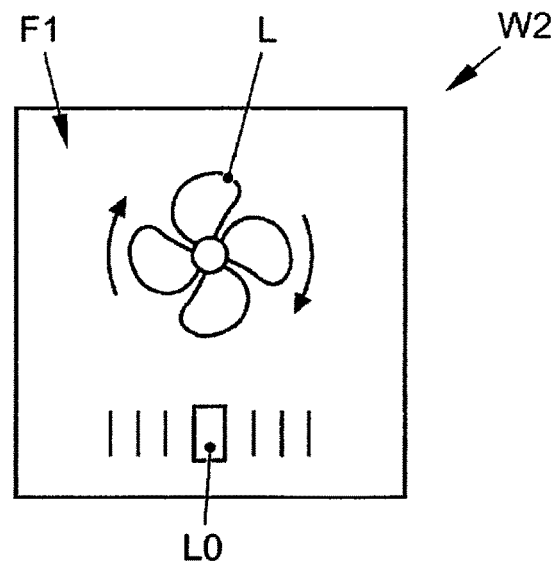
FIG. 7 schematically shows the representation of one of the bodies according to FIG. 3, which is assigned to functional area "Air conditioning" of the comfort system, in the course of rotation about a vertical and a horizontal axis.
Figure 7B:
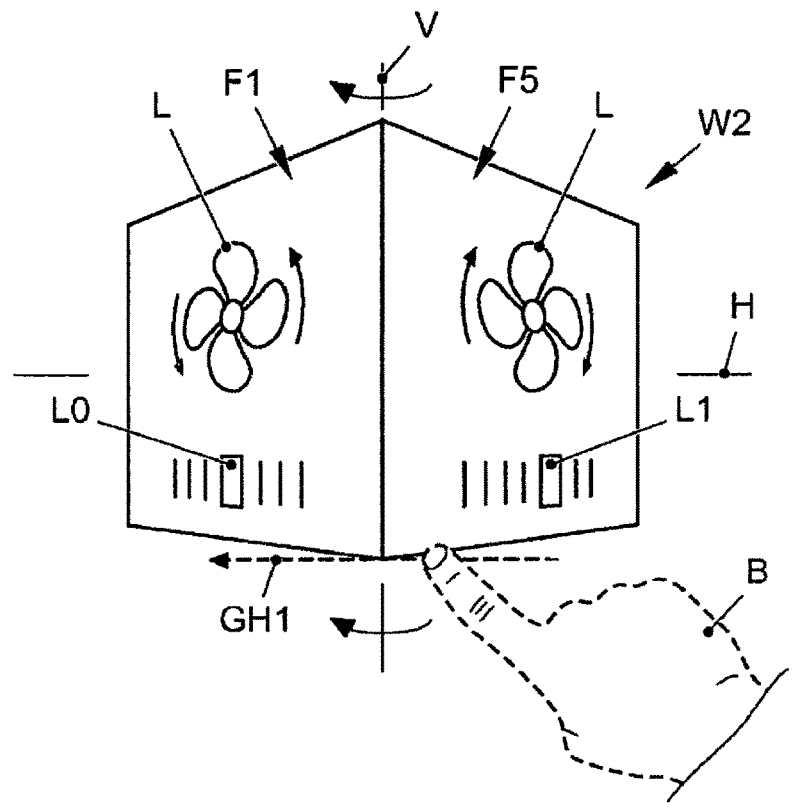

By analogy to the operation-and-execution logic already described, by rotation of cube W2 about its vertical axis V by means of horizontal swipe gestures (GH1) an operator B can increase or reduce the fan speed in accordance with his/her wishes (L1, cf. FIG. 7b).

Figure 7C:
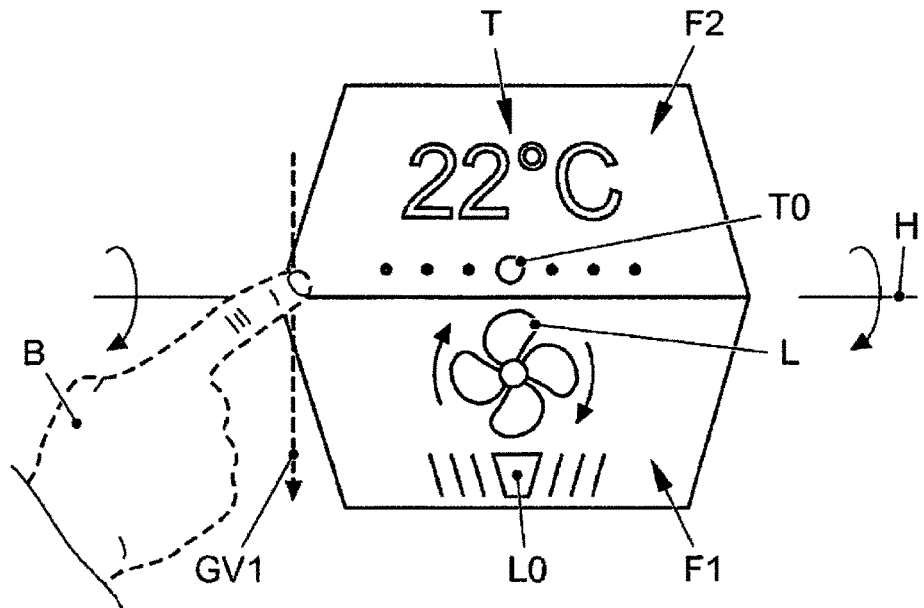
Figure 7D:
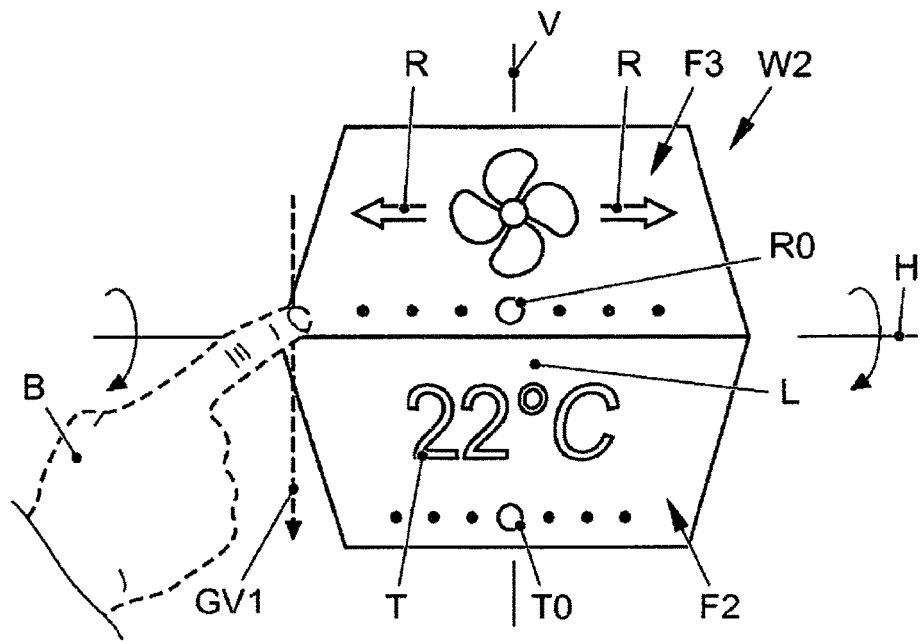

By rotation of cube W2 about its horizontal axis H by means of vertical swipe gestures (GV1), the operator B can switch correspondingly between the displays of implementable functions "Setting of fan speed" (L, L0, L1), "Temperature setting" (T, T0) and "Setting of air distribution" (R, R0) (cf. FIGS. 7c and d). A corresponding switch of the display of the values capable of being implemented or set (lower/higher temperature; air distribution more to the right or left, etc.) by the comfort system 103 (105) can then be effected in turn by rotation of cube W2 about its vertical axis V.

Finally, with reference to FIG. 8 it will be explained that implementable functions can also be assigned to a cube in a manner depending on the position of at least one other cube.

Accordingly, cube W1 and cube W4 are assigned to functional area 104 "Audio". Cube W1 serves for the selection of audio sources available in the motor vehicle K. In the instantaneous position of cube W1, an implementable function AQ1 "Select audio source AQ1" is displayed on its face F1 and is also selected by the comfort system 103 after a certain time-delay. The audio source AQ1 in the disclosed embodiment is a radio.

Figure 8A:
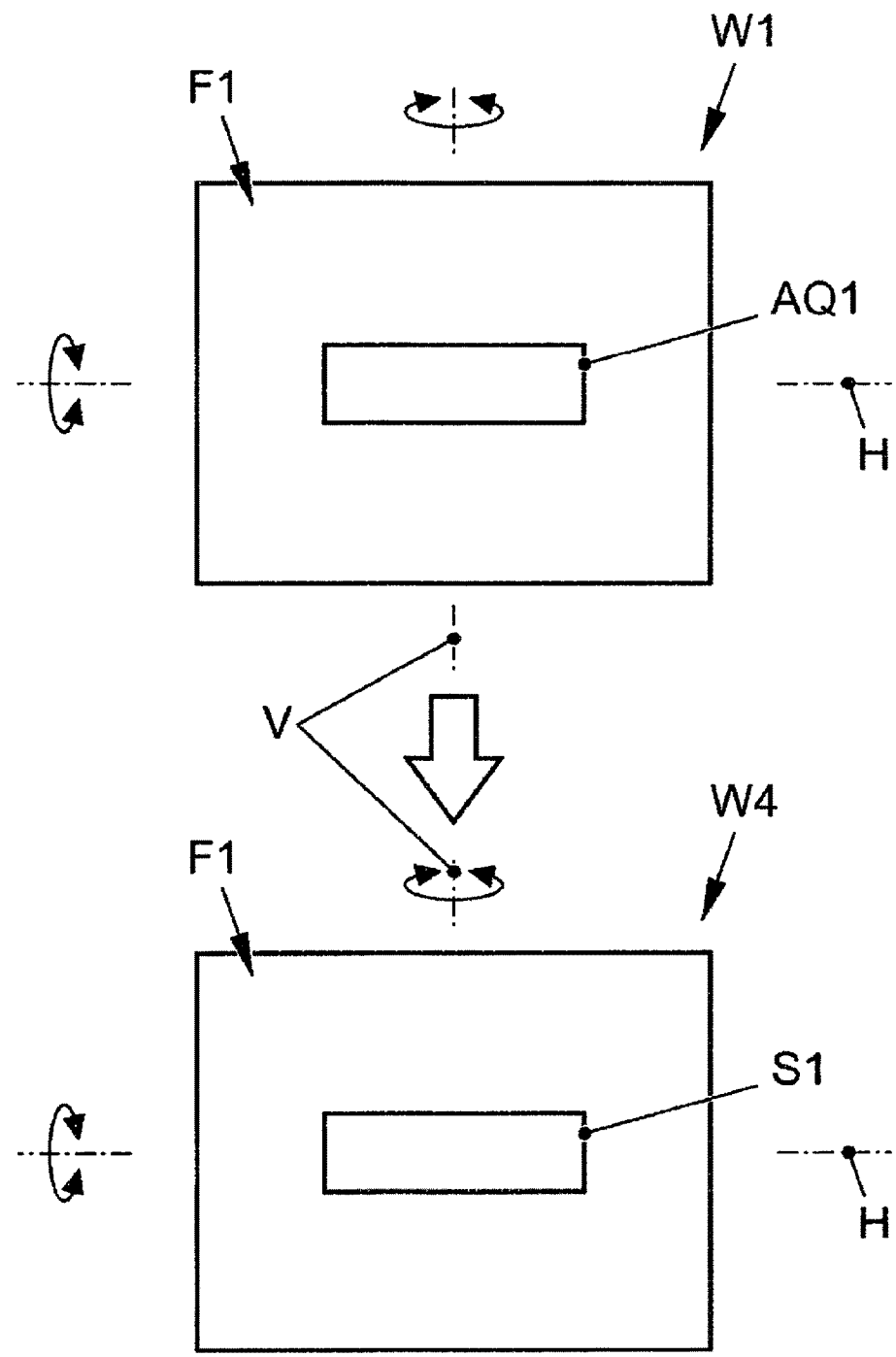
FIG. 8 schematically shows the representation of two of the bodies according to FIG. 3, which are assigned to functional area "Audio" of the comfort system, wherein the functions displayed on the one body take place in a manner depending on the position of the other body.

Therefore a radio station S1 to be selected is displayed on cube W4 (cf. FIG. 8a). In this connection it is conceivable that by rotation of cube W4 about a horizontal axis H it is possible to navigate between stored radio stations and to start, by a rotation of cube W4 about a vertical axis V, a station scan to the next-higher or next-lower station frequency.

Figure 8B:
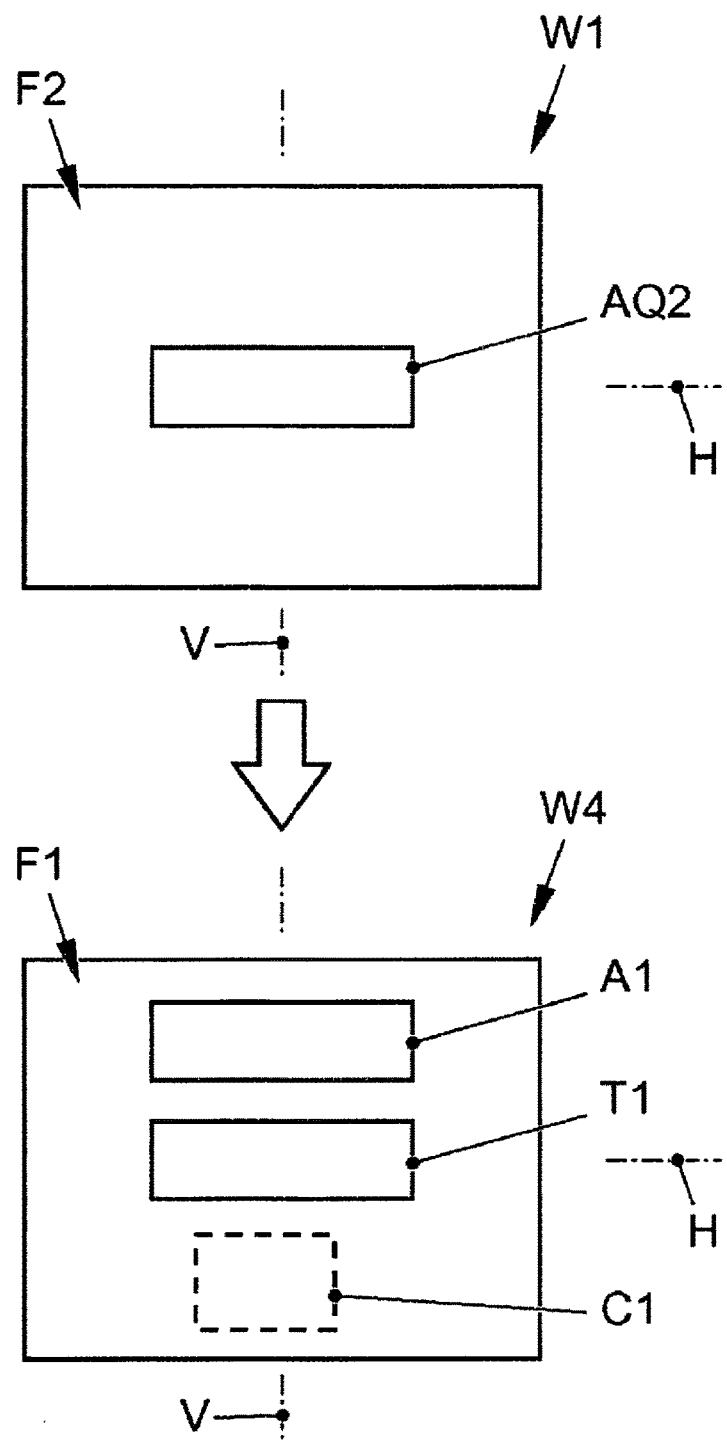

In FIG. 8b, cube W1 is located in a position in which, after rotation about a horizontal axis H, an implementable function AQ2 "Select audio source AQ2" is displayed on its face F2 and is also selected by the comfort system 103 after a certain time-delay. The audio source AQ2 in the disclosed embodiment is an MP3 player.

Therefore a playable track T1 of an album A1 is displayed on cube W4. By rotation of cube W4 about a horizontal or vertical axis (H, V), it is then possible to navigate between all the playable tracks, as already described.

The concept is not restricted to the above embodiments. These were drawn upon only for the purpose of general elucidation of the central concept. Rather, within the scope of its range of protection, the concept may also take the form of embodiments or distinctive features other than those previously described. In this connection, the concepts may also exhibit features that represent a combination of individual features of the respective claims.

LIST OF REFERENCE SYMBOLS 100 center console
101 instrument panel
102 touch-screen 103 comfort system
104 functional area "Audio"
105 functional area "Air conditioning"
106 functional area "Communication"
107 functional area "Navigation"
a spacing between the cubes
A1 first stored album
A2 second stored album
A49 49th stored album
AQ1 audio source to be selected
AQ2 audio source to be selected
B operator
C1 cover of the first album
C2 cover of the second album
C49 cover of the 49th album
F1-F6 visible faces of the cube
GH1 horizontal swipe gesture to the left
GH2 horizontal swipe gesture to the right
TV1 vertical swipe gesture downward
GV2 vertical swipe gesture upward
H horizontal axis
K motor vehicle
L fan symbol
L0 fan speed to be set (standard)
L1 fan speed to be set (increased)
R direction of air stream
R0 air distribution to be set (standard)
S1 radio station to be selected
T temperature indication
T0 temperature to be set (standard)
T1 first track of a selected album
T12 twelfth track of a selected album
V vertical axis
W cube
W1-W6 cubes, some of which are assigned to different functional areas

The invention claimed is:

1. A method for controlling a motor-vehicle comfort system, wherein control takes place with the aid of a touch-sensitive display-and-operating area assigned to the comfort system, the method comprising:
generating, in at least one operating mode, a virtual representation of at least one body giving a three-dimensional impression in a first position on the touch-sensitive display-and-operating area; and
displaying at least one function capable of being implemented by the comfort system on a surface of the body;
representing a plurality of bodies giving the three-dimensional impression, spaced from one another, on the display-and-operating area; and
assigning functions from a functional area of the comfort system to one or more bodies,
wherein the body is rotatable using a horizontal swipe gesture about a vertical axis and a vertical swipe gesture about a horizontal axis to select a surface of the body to perform assignment of a function implemented by the comfort system,
wherein, as a result of rotation about the horizontal axis, the body is moved into a different position in which at least one other function capable of being implemented by the comfort system is displayed on the visible surface of the body,
wherein, as a result of rotation about the vertical axis, the body is moved into a different position in which at least one value of a function capable of being implemented by the comfort system is displayed on the visible surface of the body,
wherein assigning functions comprises assigning functions to a body of the plurality of bodies based on a position of at least one other body of the plurality of bodies, and
implementing, by the comfort system, the at least one function and the at least one value of the function currently displayed on the display-and-operating area.

2. The method of claim 1, further comprising implementing the at least one function displayed on the display-and-operating area in response to a detection of a certain time-delay after the body is in a particular position.

3. The method of claim 1, further comprising associating a particular store of functions with a first and with a last displayable function in response to the rotation of the body about a particular axis, wherein after repeated rotation of the body in a particular direction and after an associated display of the last or first function from this store of functions, the first or last function is displayed again upon further rotation of the body in the same direction.

4. The method of claim 3, wherein the selection of tracks from a particular music album is made available by way of store of the functions with the rotation of the body about a first axis, and the selection of a track from different music albums is made available with the rotation of the body about a second axis.

5. The method of claim 4, wherein the first axis is vertical and the second axis is horizontal.

6. A transportation vehicle with a comfort system and with at least one touch-sensitive display-and-operating area assigned to said system for the purpose of operation, wherein the display-and-operating area are controllable so that a virtual representation of a plurality of bodies giving a three-dimensional impression is presented on area, spaced from one another, and functions from a functional area of the comfort system to one or more bodies are assigned, wherein each of the plurality of bodies is rotatable using a horizontal swipe gesture about a vertical axis and a vertical swipe gesture about a horizontal axis to select a surface of the body to perform assignment of a function implemented by the comfort system, wherein a selection of implementable functions of the comfort system is possible by rotation of a body of the plurality of bodies about the horizontal axis by a swipe gesture, wherein a selection of values associated with a selected implementable function of the comfort system is a result of rotation of a body of the plurality of bodies about the vertical axis by a swipe gesture, wherein the functions are assigned to the body of the plurality of bodies based on a position of at least one other body of the plurality of bodies, and wherein the comfort system implements the selected function and the selected value of the function currently displayed on the display-and-operating area.

7. The transportation vehicle of claim 6, wherein the at least one function is displayed on the display-and-operating area in response to a detection of a certain time-delay after the body is in a particular position.

8. The transportation vehicle of claim 7, wherein a particular store of functions is associated with a first and with a last displayable function in response to the rotation of the body about a particular axis, wherein after repeated rotation of the body in a particular direction and after an associated display of the last or first function from this store of functions, the first or last function is displayed again upon further rotation of the body in the same direction.

9. The transportation vehicle of claim 8, wherein the selection of tracks from a particular music album is made available by way of store of the functions with the rotation of the body about a first axis, and the selection of a track from different music albums is made available with the rotation of the body about a second axis.

10. The transportation vehicle of claim 9, wherein the first axis is vertical and the second axis is horizontal.

\* \* \* \* \*